United States Patent [19]
Ryan

[11] Patent Number: 6,154,752
[45] Date of Patent: Nov. 28, 2000

[54] CHRONOLOGICAL IDENTIFICATION OF HYPER TEXT LINKS DURING BACK TRACKING

[75] Inventor: Robert Ryan, Centreville, Va.

[73] Assignee: Lockheed Martin Corporation, Bethesda, Md.

[21] Appl. No.: 09/023,641

[22] Filed: Feb. 13, 1998

[51] Int. Cl.⁷ ..................................................... G06F 15/00
[52] U.S. Cl. ......................... 707/501; 707/500; 707/513; 345/329; 345/333; 345/334
[58] Field of Search ................... 707/501, 500, 707/528, 513; 345/329, 333, 334

[56] References Cited

U.S. PATENT DOCUMENTS

| | | | |
|---|---|---|---|
| 5,297,249 | 3/1994 | Bernstein et al. | 114/356 |
| 5,341,293 | 8/1994 | Vertelney et al. | 707/530 |
| 5,408,659 | 4/1995 | Cavendish et al. | 707/501 |
| 5,428,731 | 6/1995 | Powers | 707/501 |
| 5,428,735 | 6/1995 | Kahl et al. | 707/4 |
| 5,487,139 | 1/1996 | Saylor et al. | 345/435 |
| 5,526,520 | 6/1996 | Krause | 707/104 |
| 5,532,715 | 7/1996 | Bates et al. | 707/528 |
| 5,745,103 | 4/1998 | Smith | 345/199 |
| 5,787,254 | 7/1998 | Maddalozzo, Jr. et al. | 395/200.58 |
| 5,806,077 | 9/1998 | Wecker | 707/501 |
| 5,870,769 | 2/1999 | Freund | 707/501 |
| 5,908,467 | 6/1999 | Barrett et al. | 707/101 |
| 5,924,104 | 7/1999 | Earl | 707/501 |
| 5,991,781 | 11/1999 | Nielsen | 707/513 |
| 6,035,325 | 3/2000 | Potts, Jr. | 709/10 |
| 6,037,935 | 3/2000 | Bates et al. | 345/335 |

OTHER PUBLICATIONS

Alan Frank, Lesson 95: Hypertext Markup Language: Writing HTML code isn't as difficult as you might think, LAN Magazine, v11 n7 p27 (2), Jul. 1996.

Arlan Levitan, A First Step for Web Wizards, Computer Shopper v16 n4 p 404 (1) Apr. 1997.

Rick Broida, Book An Office Suite, Home Office Computing, v15 n7 p71 (5), Jul., 1996.

*Primary Examiner*—Stephen S. Hong
*Assistant Examiner*—Cong-Lac Huynh
*Attorney, Agent, or Firm*—Lane, Aitken and McCann

[57] ABSTRACT

A browser is provided in which the color of a selected linking word in a document is changed to a color that indicates the relative order in which the linking word was selected. As an example, consider a document with three hyperlinking words and the colors red, yellow and green, with red specifying the most recent hyperlink selected, yellow the next most recent, and green the least recent of the three. When the first linking word is selected, its color is changed from, for example the prior art blue, to red when the user drills back to the original web page document. When the next link is selected, it is colored red when the user returns to the original document and the first selected linking word is colored yellow. When a third hyperlinked word is selected, it is colored red on return, the first selected hyperlink word, which was yellow, is colored green, and the second selected hyperlink word, which was red, is colored yellow. The user, looking at the document, can easily determine the sequence or order in which the document was drilled. Here it will be appreciated that the term linking word is not limited to alpha characters, but also includes numerics and icons.

10 Claims, 3 Drawing Sheets orange
"WHEN IN THE COURSE OF HUMAN EVENTS, IT BECOMES NECESSARY FOR
yellow
ONE PEOPLE TO DISSOLVE THE POLITICAL BANDS WHICH HAVE CONNECTED THEM WITH ANOTHER, AND TO ASSUME AMONG THE POWERS OF THE EARTH, THE
blue
SEPARATE AND EQUAL STATION TO WHICH THE LAWS OF NATURE AND OF
red
NATURE'S GOD ENTITLE THEM A DECENT RESPECT TO THE OPINIONS OF

MANKIND REQUIRES THAT THEY SHOULD DECLARE THE CAUSES WHICH IMPEL

THEM TO THE SEPARATION."

blue
"WHEN IN THE COURSE OF <u>HUMAN EVENTS</u>, IT BECOMES NECESSARY FOR
                              blue
ONE PEOPLE TO DISSOLVE THE <u>POLITICAL BANDS</u> WHICH HAVE CONNECTED THEM WITH ANOTHER, AND TO ASSUME AMONG THE POWERS OF THE EARTH, THE
                                                               blue
SEPARATE AND EQUAL STATION TO WHICH THE <u>LAWS OF NATURE</u> AND OF
                                                                                                   blue
NATURE'S GOD ENTITLE THEM A DECENT RESPECT TO THE <u>OPINIONS OF</u>

<u>MANKIND</u> REQUIRES THAT THEY SHOULD DECLARE THE CAUSES WHICH IMPEL

THEM TO THE SEPARATION."

FIG.2A blue
"WHEN IN THE COURSE OF <u>HUMAN EVENTS</u>, IT BECOMES NECESSARY FOR
                              red
ONE PEOPLE TO DISSOLVE THE <u>POLITICAL BANDS</u> WHICH HAVE CONNECTED THEM WITH ANOTHER, AND TO ASSUME AMONG THE POWERS OF THE EARTH, THE
                                                               blue
SEPARATE AND EQUAL STATION TO WHICH THE <u>LAWS OF NATURE</u> AND OF
                                                                          blue
NATURE'S GOD ENTITLE THEM A DECENT RESPECT TO THE <u>OPINIONS OF</u>

<u>MANKIND</u> REQUIRES THAT THEY SHOULD DECLARE THE CAUSES WHICH IMPEL

THEM TO THE SEPARATION."

FIG.2B red
"WHEN IN THE COURSE OF HUMAN EVENTS, IT BECOMES NECESSARY FOR
                       orange
ONE PEOPLE TO DISSOLVE THE POLITICAL BANDS WHICH HAVE CONNECTED THEM WITH ANOTHER, AND TO ASSUME AMONG THE POWERS OF THE EARTH, THE
                                               blue
SEPARATE AND EQUAL STATION TO WHICH THE LAWS OF NATURE AND OF
                                                                    blue
NATURE'S GOD ENTITLE THEM A DECENT RESPECT TO THE OPINIONS OF

MANKIND REQUIRES THAT THEY SHOULD DECLARE THE CAUSES WHICH IMPEL

THEM TO THE SEPARATION."

FIG.2C orange
"WHEN IN THE COURSE OF HUMAN EVENTS, IT BECOMES NECESSARY FOR
                    yellow
ONE PEOPLE TO DISSOLVE THE POLITICAL BANDS WHICH HAVE CONNECTED THEM WITH ANOTHER, AND TO ASSUME AMONG THE POWERS OF THE EARTH, THE
                                             blue
SEPARATE AND EQUAL STATION TO WHICH THE LAWS OF NATURE AND OF
                                                                     red
NATURE'S GOD ENTITLE THEM A DECENT RESPECT TO THE OPINIONS OF

MANKIND REQUIRES THAT THEY SHOULD DECLARE THE CAUSES WHICH IMPEL

THEM TO THE SEPARATION."

FIG.2D

CHRONOLOGICAL IDENTIFICATION OF HYPER TEXT LINKS DURING BACK TRACKING

BACKGROUND OF THE INVENTION

1. Field of the Invention

This invention relates to an improvement in web browser technology, and more particularly to a method for providing a user a visual display indicating the sequence in which hyperlinked materials were selected in a displayed page.

2. Description of the Prior Art

Users navigating across web pages are limited in their ability to backtrack over material, which was previously seen using hyperlinked references in, for example, a document. After a user opens a web page, they often begin a process referred to in the art as drilling down. Text material on a displayed web page is linked to other pages, which can be accessed by pointing to linking words on the displayed page. The linking words are typically colored light blue in the displayed text and the color is changed, typically to a dark blue, when the word is selected in order to call up and display the web page to which it is hyperlinked. Often, this process is repeated with linking words on the newly displayed page used to refer to additional web pages. The user can return to the original page or any intermediate page by a process called backtracking. In browser programs in wide spread commercial use, the user backtracks by clicking on an icon on the display screen, which, each time, calls up the just previously displayed page.

Prior art browsers use a simple navigation strategy in backtracking. As previously explained, these browsers mark previously selected linking words with a color (e.g. dark blue) to distinguish them from linking words that were not previously selected. Although this system allows the user to distinguish those sites that have been previously viewed from those that have not been previously viewed, it does not tell the user the relative sequence in which the sites were viewed and/or visited.

SUMMARY OF THE INVENTION

An object of this invention is the provision of a browser method which shows the user the sequence in which hyperlinked items on a web page are selected.

A further object of the invention is the provision of such a method which can be simply incorporated in commercially available, prior art browser programs.

Briefly, this invention contemplates the provision of a browser in which the color of a selected linking word in a document is changed to a color that indicates the relative order in which the linking word was selected. As an example, consider a document with three hyperlinking words and the colors red, yellow and green, with red specifying the most recent hyperlink selected, yellow the next most recent, and green the least recent of the three. When the first linking word is selected, its color is changed from, for example the prior art blue, to red when the user drills back to the original web page document. When the next link is selected, it is colored red when the user returns to the original document and the first selected linking word is colored yellow. When a third hyperlinked word is selected, it is colored red on return, the first selected hyperlink word, which was yellow, is colored green, and the second selected hyperlink word, which was red, is colored yellow. The user, looking at the document, can easily determine the sequence or order in which the document was drilled. Here it will be appreciated that the term linking word is not limited to alpha characters, but also includes numerics and icons.

BRIEF DESCRIPTION OF THE DRAWINGS

FIG. 2A is a view of an exemplary screen display of a web document before the hyperlinks are drilled down with a browser incorporating this invention.

FIGS. 2B through 2D are respectively views of the screen in FIG. 2A after three hyperlinks have been selected and the user has backtracked to the original document.

DETAILED DESCRIPTION OF A PREFERRED EMBODIMENT

Figure 1:
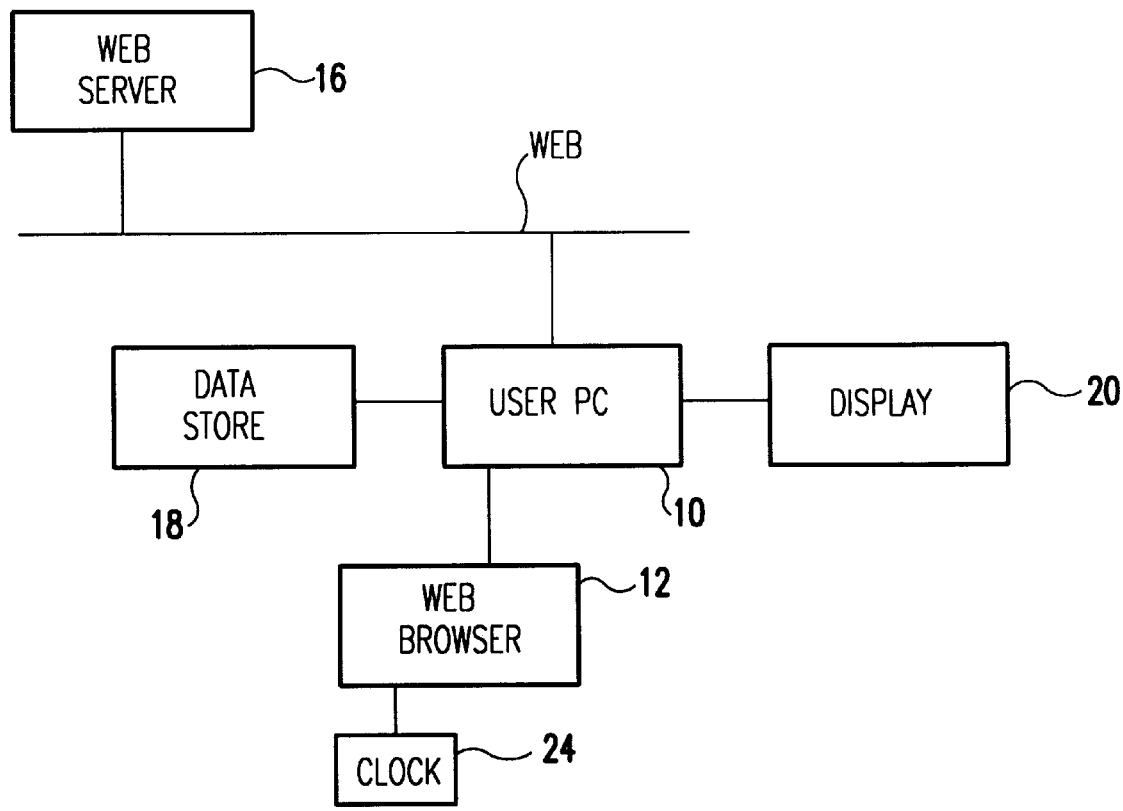
FIG. 1 is a block diagram of a typical system employing the browser feature of this invention.

Referring now to FIG. 1, a user PC terminal 10 has installed therein browser program 12, which basically may be of a commercially available design, such as the NetScape Navigator browser or the Microsoft Internet Explorer browser. The browser program is modified to incorporate the hyperlink selection sequence display, which is the subject of this invention. Any other browser, or any other instrument, device, or program, which is used to access information which contains hypetext links may be used. Here it will be appreciated that the above mentioned commercially available browser programs and other browser programs download text from a web server 16 into data store 18, display the text on a color monitor 20 with link words colored, for example blue. The color of a selected link word changes upon return to the document to show it has been selected, for example it changes to dark blue.

In accordance with a specific embodiment of this invention, a time of day clock 24, marks with the time of selection of each link word as it is selected. The browser program 12 then assigns a color to each previously selected link on the basis of their relative time of selection, which establishes their order or sequence of selection. Colors are assigned to the order in which the hyperlinks were selected; for example, red to the most recently selected and in order from this most recent to the first selected (i.e. earliest in time selected) orange, yellow, green, blue, indigo, and violet.

FIG. 2A illustrates a text sample as it would be displayed originally with the link phases of the text indicated as colored blue. FIG. 2B illustrates the text of FIG. 2A after the link "POLITICAL BANDS" had been selected and the user has backtracked to the original text. The link "POLITICAL BANDS" is now colored red. Next the link "HUMAN EVENTS" is selected, and FIG. 2C shows the text as it would appear after backtracking to the original text; "HUMAN EVENTS" is now colored red and "POLITICAL BANDS" is colored orange, for example. FIG. 2D shows the backtracked text after "OPINIONS OF MANKIND had been selected. Now "OPINIONS OF MANKIND" is red, "HUMAN EVENTS" is orange and "POLITICAL BANDS" is yellow.

While the invention has been described in terms of a single preferred embodiment, those skilled in the art will recognize that the invention can be practiced with modification within the spirit and scope of the appended claims.

Having thus described my invention, what I claim as new and desired to secure by Letters Patent is as follows:

1. A web browser method including:
    (a) displaying a first document on a browser controlled processor display screen, said first document including a plurality of hyperlinks that serve as links to other documents;

(b) selecting one of said plurality of hyperlinks;

(c) displaying a second document linked to said one of said plurality of hyperlinks selected in said step (b);

(d) backtracking to and displaying said first document displayed in said step (a);

(e) changing a displayed color of said one of said plurality of hyperlinks selected in said step (b) to a first color representing a relative chronological selection order of said one of said plurality of hyperlinks selected;

(f) selecting another of said plurality of hyperlinks from said first document displayed in said step (d);

(g) displaying a third document linked to said another of said plurality of hyperlinks selected in said step (f);

(h) backtracking to and displaying said first document displayed in said step (a);

(i) changing a displayed color of said another of said plurality of selected in step (f) to said first color representing a relative chronological selection order of said another of said plurality of hyperlinks selected;

(j) changing said displayed color of said one of said plurality of hyperlinks selected in said step (b) to a second color representing a relative chronological selection order of said one of said plurality of hyperlinks selected;

(k) continuing to display said first document initially displayed in said step (a), and for each remaining additional hyperlink selected from said plurality of hyperlinks, upon displaying an additional document linked to said each remaining additional hyperlink selected, and upon backtracking to and displaying said first document, changing a displayed color of said each remaining additional hyperlink selected such that a most recently selected of said plurality of hyperlinks is changed to said first color, and such that a next most recently selected of said plurality of hyperlinks is changed to said second color, and such that for said each remaining additional hyperlink, a displayed color of is changed to another color representing relative recency of selection of said each of said remaining additional hyperlinks so that said displayed colors of said plurality of hyperlinks previously selected and backtracked from to said first document convey a relative chronological selection order of said plurality of hyperlinks previously selected.

2. A web browser system including means for displaying the sequence in which links were selected, the system comprising:

means for displaying a first document, said first document including hyperlinks to other documents;

means for selecting one of said hyperlinks;

means for displaying a second document linked to said one of said hyperlinks, responsive to said means for selecting;

means for backtracking to and for displaying said first document;

means for changing the color of said one of said hyperlinks to a first color;

means for selecting another of said hyperlinks from said first document;

means for displaying a third document linked to said another of said hyperlinks;

means for backtracking to and for displaying said first document from said third document;

means for changing the color of said another of said hyperlinks to said first color;

means for changing the color of said one of said hyperlinks to a second color;

means for changing the color of all hyperlinks that were previously selected of said hyperlinks in said first document, including means for changing the color of the most recently selected of said hyperlinks to said first color and means for changing the color of each previously selected of said hyperlinks so that the color of said hyperlinks that were previously selected in said first document indicates the sequence in which said hyperlinks that were previously selected were selected.

3. A web browser system comprising:

a first display that displays a first document, said first document including a plurality of links to other documents;

a first selector that selects one of said plurality of hyperlinks;

a second display that displays a second document linked to said one of said plurality of hyperlinks;

a first back selector that backtracks to and displays said first document;

a first color changer that changes the color of said one of said plurality of hyperlinks to a first color;

a second selector that selects another of said plurality of hyperlinks from said first document;

a third display that displays a third document linked to said another of said plurality of hyperlinks;

a second back selector that backtracks to and displays said first document from said third document;

a second color changer that changes the color of said another of said plurality of hyperlinks to said first color;

a third color changer that changes the color of said one of said plurality of hyperlinks to a second color;

a fourth color changer that changes the color of all selected links of said plurality of links in said first document, including a fifth color changer that changes the color of the most recently selected of said plurality of links to said first color and that changes the color of each previously selected of said plurality of links so that the color of said selected links in said first document indicates the sequence in which said selected links were selected.

4. A computer program product comprising a computer usable medium having computer program logic stored therein, wherein said computer program product comprises a web browser including means for displaying the sequence in which links were selected from a document, said computer program logic comprising:

means for enabling a computer to display a first document, said first document including a plurality of means for enabling the computer to link to other documents;

means for enabling the computer to select one of said plurality of means for enabling the computer to link;

means for enabling the computer to display a second document linked to said one of said plurality of means for enabling the computer to link, responsive to said means for enabling a computer to select;

means for enabling the computer to backtrack to and display said first document;

means for enabling the computer to change the color of said one of said plurality of means for enabling the computer to link to a first color;

means for enabling the computer to select another of said plurality of means for enabling the computer to link from said first document;

means for enabling the computer to display a third document linked to said another of said plurality of means for enabling the computer to link;

means for enabling the computer to backtrack to and display said first document from said third document;

means for enabling the computer to change the color of said another of said plurality of means for enabling the computer to link to said first color;

means for enabling the computer to change the color of said one of said plurality of means for enabling the computer to link to a second color;

means for enabling the computer to change the color of all selected means for enabling the computer to link of said plurality of means for enabling the computer to link in said first document, including means for enabling the computer to change the color of the most recently selected of said plurality of means for enabling the computer to link to said first color and means for enabling the computer to change the color of each previously selected of said plurality of means for enabling the computer to link so that the color of said selected means for enabling the computer to link in said first document indicates the sequence in which said selected means for enabling the computer to link were selected.

5. The method according to claim 1, wherein said relative chronological selection order of said plurality of hyperlinks previously selected is depicted in an intuitive representation of said relative chronological selection order.

6. The method according to claim 5, wherein said intuitive representation comprises ordered colors of a color spectrum.

7. The method according to claim 6, wherein said ordered colors use hot colors of said color spectrum to indicate most recently visited hyperlinks, and said ordered colors use cold colors of said color spectrum to indicate least recently visited hyperlinks.

8. The method according to claim 6, wherein said color spectrum comprises ordered colors including red, orange, yellow, green, blue, indigo, and violet.

9. A method for displaying relative chronological selection of hyperlinks in a browser, including the steps of:

(a) displaying a document on a browser, said document including a plurality of previously selected hyperlinks to other documents, said displaying step comprising the steps of:

(1) determining a most recently selected hyperlink of said plurality of previously selected hyperlinks;

(2) assigning a color to said most recently selected hyperlink;

(3) determining a next most recently selected hyperlink of said plurality of previously selected hyperlinks;

(4) assigning a different color to said next most recently selected hyperlink;

(5) repeating steps (3) and (4) for all of said plurality of selected hyperlinks of said document, up to an earliest in time selected hyperlink, so that the color of each of said plurality of selected hyperlinks indicates the sequence in which said plurality of selected hyperlinks were selected from said document.

10. The method according to claim 9, wherein said assigning steps comprise:

assigning said colors for said more recently visited hyperlink to said least recently visited hyperlink in a color spectrum order from red, orange, yellow, green, blue, indigo and violet.

* * * * *